(12) United States Patent
Potter

(10) Patent No.: US 8,552,682 B2
(45) Date of Patent: Oct. 8, 2013

(54) BATTERY CHARGING SYSTEM FOR HYBRID VEHICLES

(75) Inventor: Michael Potter, Condcue (IT)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 12/968,101

(22) Filed: Dec. 14, 2010

(65) Prior Publication Data

US 2011/0140660 A1    Jun. 16, 2011

(30) Foreign Application Priority Data

Dec. 14, 2009   (GB) ................................. 0921770.4

(51) Int. Cl.
*H02J 7/00*       (2006.01)
*H02J 7/14*       (2006.01)

(52) U.S. Cl.
USPC ............................ 320/104; 320/109; 320/115

(58) Field of Classification Search
USPC ......................................... 320/104, 109, 115
See application file for complete search history.

(56) References Cited

U.S. PATENT DOCUMENTS 3,898,547 A * 8/1975 Poole ............................. 320/109
5,081,365 A * 1/1992 Field et al. ...................... 290/45

FOREIGN PATENT DOCUMENTS

| AU | 1265292 A | 5/1993 |
| GB | 2335404 A | 9/1999 |
| JP | 2007252072 A | 9/2007 |
| WO | 9307368 A1 | 4/1993 |

OTHER PUBLICATIONS

British Patent Office, Search Report for British Application No. GB0921770.4, dated Apr. 14, 2010.

* cited by examiner

*Primary Examiner* — Samuel Berhanu
(74) *Attorney, Agent, or Firm* — Ingrassia Fisher & Lorenz, P.C.

(57) ABSTRACT

A user-operated switch is provided to enable an engine to operate a generator to charge a battery while the vehicle is parked.

5 Claims, 1 Drawing Sheet

BATTERY CHARGING SYSTEM FOR HYBRID VEHICLES

CROSS-REFERENCE TO RELATED APPLICATION

This application claims priority to German Patent Application No. 0921770.4, filed Dec. 14, 2009, which is incorporated herein by reference in its entirety.

TECHNICAL FIELD

The technical field relates to hybrid electric vehicles and in particular to a battery charging system for use in plug-in hybrid vehicles and range extended electric vehicles.

BACKGROUND

Plug-in hybrid vehicles and range extended electric vehicles have the potential to provide their owners substantial fuel cost savings and can ultimately reduce the dependence on petroleum fuels. With these vehicles, particularly range extended electric vehicles, the performance available is related to the availability of electric charge in the batteries to provide motive power or supplement the conventional internal combustion engine. Once the electric charge is depleted, the vehicle performance can be diminished.

For short local journeys with intervening time periods, a hybrid vehicle user has the opportunity to charge the vehicle battery adequately between journeys from the mains or other external electrical power source. For longer journeys, the internal combustion engine is used, or is used more, and this can lead to deterioration in vehicle performance.

In view of the foregoing, it is desirable to provide a system that avoids reliance, or increased reliance, on the engine of a hybrid vehicle when being driven. In addition, other desirable features and characteristics will become apparent from the subsequent summary and detailed description, and the appended claims, taken in conjunction with the accompanying drawings and this background.

SUMMARY

According to a first embodiment, there is provided a battery charging system for a hybrid vehicle comprising a battery arranged to supply power to an electric motor, an engine capable of driving a generator to supply power to the battery, and a controller arranged to activate the engine automatically in response to prevailing vehicle operation conditions, wherein the system further comprises a user-operated switching element for activating the engine. At least one advantage of this system is that it enables a user of the vehicle to override the normal operation of the battery charging system when appropriate.

The system preferably comprises a sensor for detecting a charge level state of the battery, the sensor being arranged to stop or prevent activation of the engine when the charge level state exceeds a predetermined level. Alternatively the system comprises a timer for controlling the timing of the operation of the switching element for activating the engine. Such arrangements prevent the engine from operating when no longer required, i.e., when the predetermined charge level state has been attained.

According to a second embodiment, there is provided a method of charging a battery of a hybrid vehicle using an engine thereof. When the vehicle is being driven, a battery charge state level is sensed and, when it falls below a predetermined threshold, the engine is triggered automatically to charge the battery and, when the vehicle is parked, manually activating a switch element to operate the engine to charge the battery. At least one advantage of this method is that a user of the vehicle can exploit a period during which the vehicle is not travelling to prepare the battery for the next journey.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

The expression "hybrid vehicle" as used in this specification covers all hybrid electric vehicles, plug-in hybrids (PHEV), range-extended vehicles (REV) etc. In particular it embraces all vehicles having an internal combustion engine (or other secondary source of power), whether or not it is capable of directly driving road wheels or other propulsion members of the vehicle, and one or more batteries which are capable of providing power to an electric motor to drive the road wheels or other propulsion members.

Figure 1:
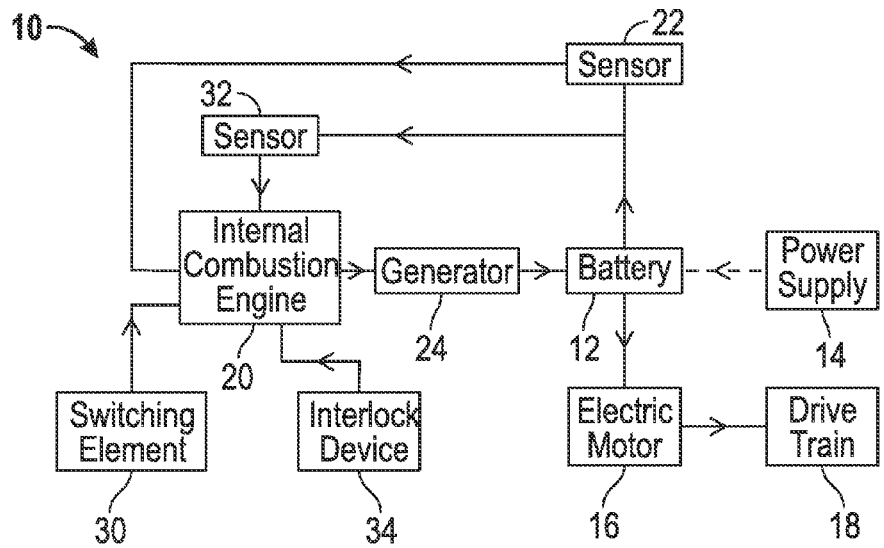
FIG. 1 is a diagram of a battery charging system of a range extended electric vehicle in accordance with a first embodiment.

Referring now to the drawings, FIG. 1 shows a battery charging system 10 for a range extended electric vehicle. The system is typically installed in a car or other road vehicle. The system comprises a battery 12 which can be charged by connection to an external electrical power supply 14, such as the mains.

The battery 12 supplies power to an electric motor 16, which in turn operates the drive train 18 to the driving road wheels of the vehicle. For extending the range of the vehicle, an internal combustion engine 20 is provided. When a charge state level of the battery falls below a predetermined threshold, e.g. during a relatively long journey, this is detected by a sensor 22 which activates engine 20 to operate a generator 24 which recharges the battery. In addition to sensor 22, the charging system 10 comprises a further device for activating the engine 20, which is a user-operated switching element and is operated as follows.

When a vehicle user is on a journey involving more than one leg, it frequently occurs that there is insufficient battery charge to complete the next leg of the journey without needing to use the engine. Thus, during an interval between journey legs, the user can operate switching element 30 to cause engine 20 to charge the battery 12 while the vehicle is stationary. When the battery is fully charged, this is indicated by sensor 22, or another sensor 32, which overrides element 30 to switch off the engine. An advantage of this arrangement is that the user avoids a drop in performance of the vehicle during the next leg of the journey. Instead, the battery can be charged by the engine while the vehicle is parked and not in use, while the user is usefully occupied elsewhere, e.g. at work, having a meal, sight-seeing etc. The battery charging system can thus be operated where there are no facilities for connecting the battery to the mains. Even during a break which is too short for the battery to be fully charged, sufficient charging can take place for reliance on the engine during the subsequent leg of the journey to be avoided, or at least reduced.

In a preferred embodiment the sensor 22 detects the battery voltage to monitor the state of charge. Alternatively, chemical, current integration or pressure methods may be used to determine the state of charge of the battery. In a modification, the sensor 22 is implemented by any convenient sensing means, which may incorporate one or more sensors already provided in the system for other purposes. In another modification, switching element 30 incorporates a timer which can be set by a user to determine the duration of the charging period while the vehicle is stationary. During a lengthy break there may be a requirement for charging not to commence at the beginning of the break, but to occur during a later part thereof; thus the timer may incorporate controls for enabling the user to set the starting and/or finishing time of a charging procedure. Sensor 32, or an additional sensor, not shown, may additionally detect one or more of the fuel level, the temperature of an engine coolant and the existence of a fault; when necessary it serves to override element 30 and to switch off the engine.

An interlock device 34 can be provided to prevent accidental activation of the engine by the switching element 30 during normal use of the vehicle. The interlock device may be configured to that activation of the engine by element 30 is prevented unless the vehicle is stationary and/or the electric motor 16 is off.

Figure 2:
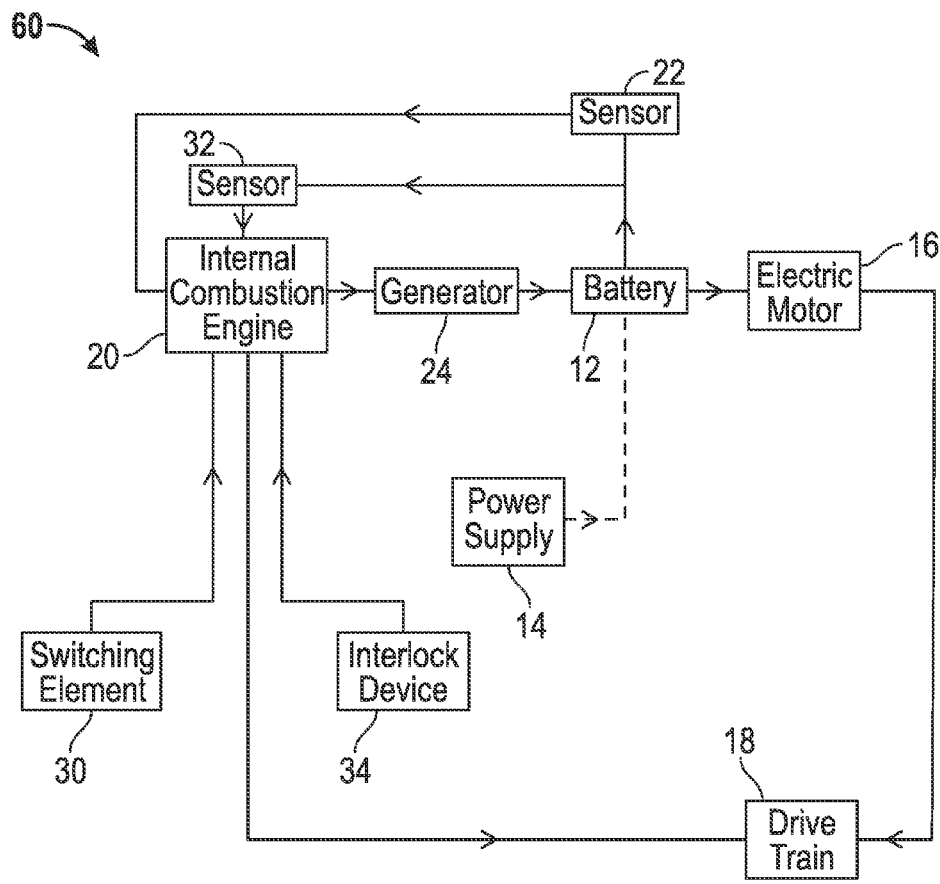
FIG. 2 is a diagram of a battery charging system of a hybrid vehicle in accordance with a second embodiment.

FIG. 2 shows a battery charging system 60 for a plug-in hybrid vehicle in which parts corresponding to those of the system of FIG. 1 have the same reference numerals. In the hybrid vehicle system, the drive train 18 for the road wheels can be driven directly by the engine 20 and directly by the electric motor 16. User-operated switching element 30 can be operated while the vehicle is parked to activate the engine 20 to operate generator 24 to charge battery 12. Again a timer device, a separate sensor 32 and/or an interlock device may be provided.

Additionally, an override device can be provided in either of the embodiments that permit the user to trigger engine 20 to charge battery 12 even when the vehicle is still being driven. This enables a user to ensure the battery is fully charged for a subsequent leg of a journey after a relatively short stop or where the user does not wish the engine to be operating for a long period while he/she is away from the vehicle.

Although reference has been made to the driving wheels of the vehicle, the invention also embraces vehicles having a single driving wheel, such as motorcycles. Systems according to the embodiments can be employed in other types of vehicle including off-road vehicles or in trains.

To enable the battery to be charged at an earlier stage for an extended journey as compared to a normal journey, either of the above-described embodiments may comprise a battery variable sensor, and a comparator that is connected to the sensor output and which compares the current value of the battery variable with an adjustable threshold value, the system further comprising a battery charging device which is connected to the comparator output and which is arranged to charge the battery when the battery variable falls below the currently-set threshold value. Such a system is disclosed in our co-pending application entitled Hybrid Vehicles filed on even date. This co-pending application also discloses a method of operating a hybrid vehicle in which, during a normal journey, the engine of the vehicle is triggered to charge a battery of the vehicle when the value of a battery variable falls below a predetermined threshold value and, during an arduous or extended journey, the engine is triggered to charge the battery when the variable value falls below a higher threshold. The content of this co-pending application is hereby incorporated by reference. Similarly, although reference has been made to a battery 12, it will be appreciated that this is normally constituted by a bank of batteries.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A battery charging system for a hybrid vehicle, comprising:
   a battery arranged to supply power to an electric motor;
   an engine capable of driving a generator to supply power to the battery;
   a controller arranged to automatically activate the engine in response to a charge state level of the battery;
   a switching element that activates the engine to charge the battery; and
   an interlock device that prevents an actuation of the engine by the switching element operation of the hybrid vehicle when the electric motor is on and the hybrid vehicle is non-stationary, and prevents an activation of the engine unless the electric motor is off and the hybrid vehicle is stationary.

2. The battery charging system according to claim 1, further comprising a sensor adapted to detect a charge level state of the battery and arranged to prevent an activation of the engine when the charge level state exceeds a predetermined level.

3. The battery charging system according to claim 1, further comprising a timer that is settable by a user to control a time of an operation of the switching element so that the engine is operable for a user-determinable duration.

4. A method of charging a battery of a hybrid vehicle, comprising:
   sensing a battery charge state level with a sensor when the hybrid vehicle is driven;
   charging the battery with an engine when the battery charge state level is less than a predetermined threshold;
   detecting an activation of a switch element indicating a request to operate the engine to charge the battery when the hybrid vehicle is parked and the electric motor is off; and
   operating the engine to charge the battery upon the detecting the activation of the switch element for a period of time determined by a user when the hybrid vehicle is parked.

5. The method according to claim 4, further comprising ceasing to operate the engine when the hybrid vehicle is parked and the battery charge state level at least reaches or exceeds a respective threshold value.

* * * * *